Nov. 9, 1954  A. BIGIO  2,693,923
AIRPLANE LIFESAVER DEVICE
Filed Feb. 10, 1954  3 Sheets-Sheet 1
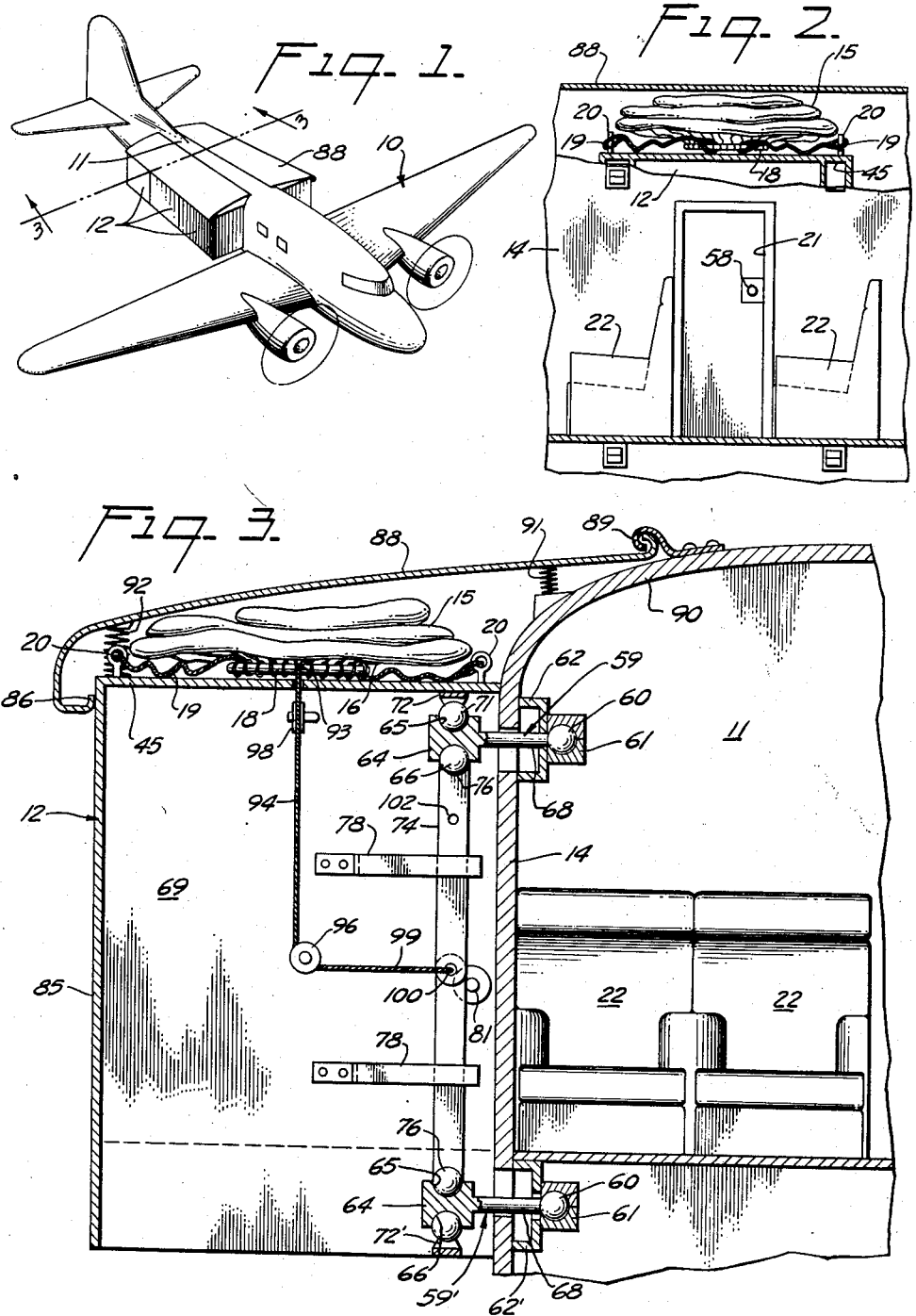

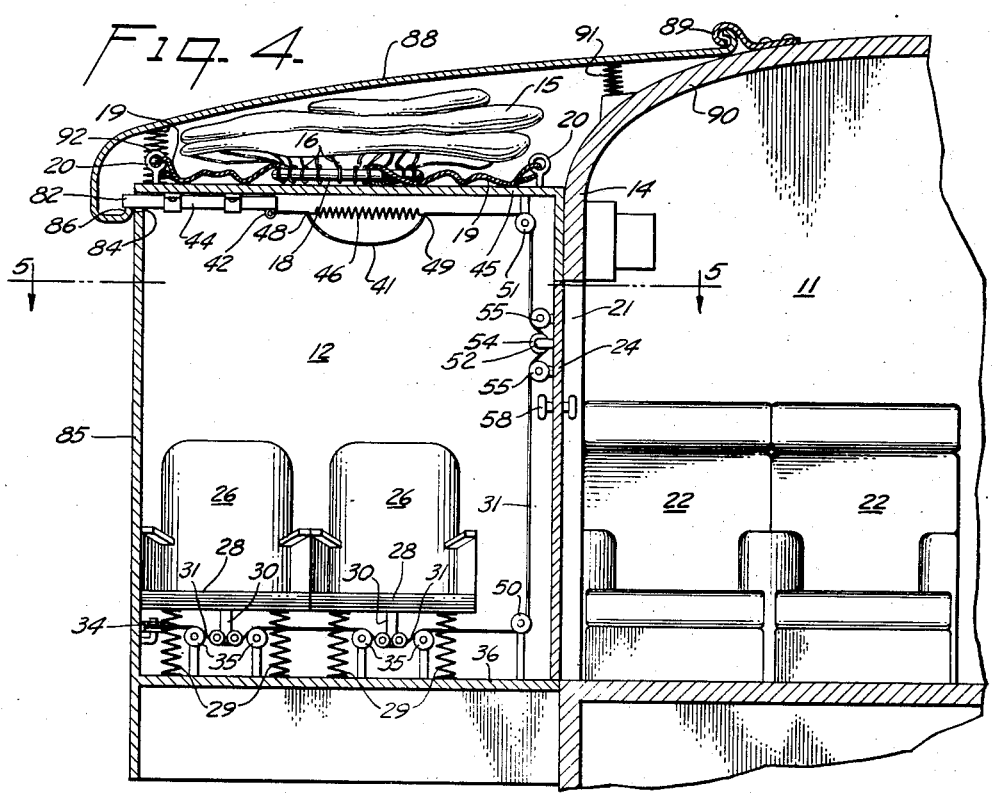
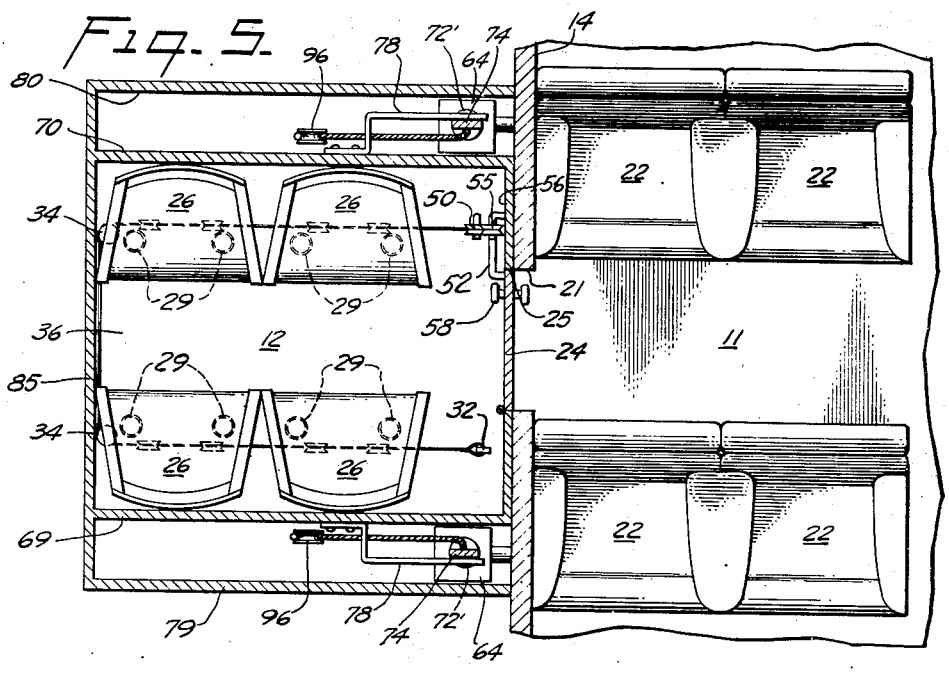

Nov. 9, 1954  A. BIGIO  2,693,923
AIRPLANE LIFESAVER DEVICE
Filed Feb. 10, 1954  3 Sheets-Sheet 3
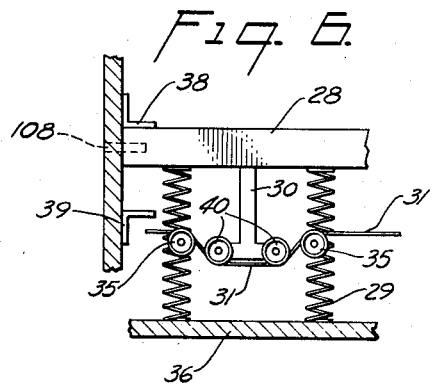
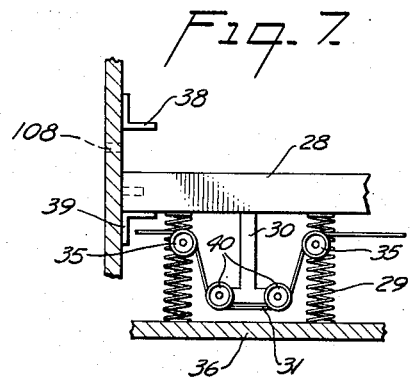
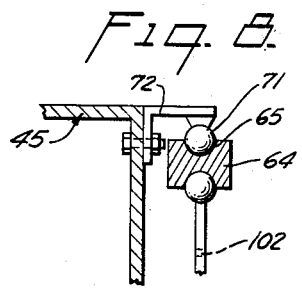
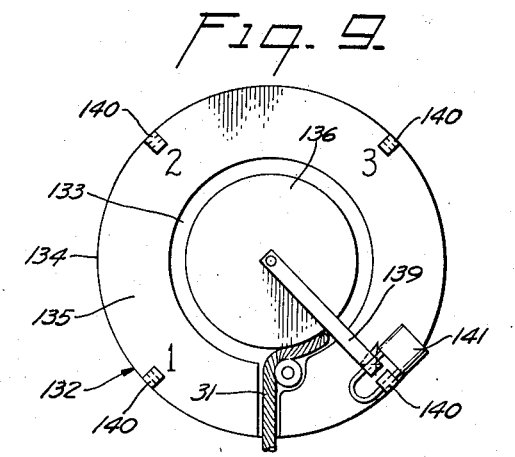
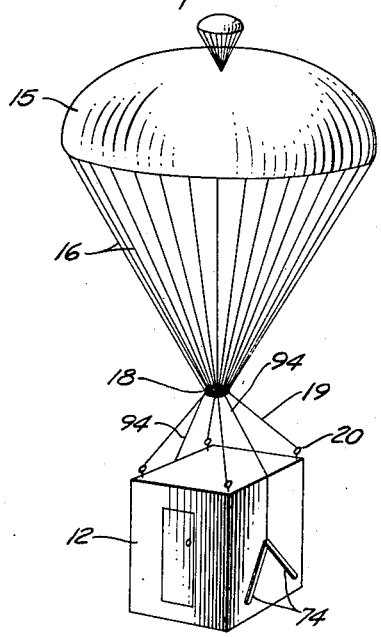
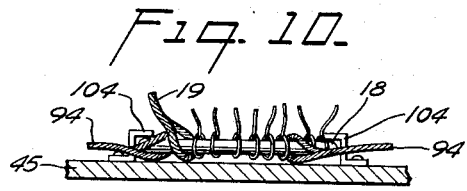
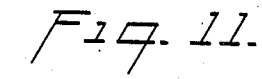

United States Patent Office 2,693,923
Patented Nov. 9, 1954

2,693,923

AIRPLANE LIFESAVER DEVICE

Albert Bigio, Brooklyn, N. Y.

Application February 10, 1954, Serial No. 409,319

7 Claims. (Cl. 244—140)

This invention relates to safety devices for use with airplanes.

The prime object of this invention is safety of passengers and crew members of airplanes and the many secondary objects of the invention as will become apparent hereinafter are all in fact, sub-objects to be attained with the purpose of achieving the prime object.

Air-flight accidents are roughly classified into two types. Material failure of the machine and mental failure of crew members. It is an object of this invention to provide an escape device which will require substantially no action on the part of the crew for its operation. It is likewise an object of this invention to provide a device which will minimize fear in the minds of passengers.

More specifically it is an object of the invention to provide a device which will not require the passengers to perform any act when they leave the plane that will especially cause fear, as is frequently the case when a person having only a parachute must step out into the open air.

Another object is to provide a compartment detachable from the plane which may be provided with the necessities of life and sanitation especially so that women may be able to cleanse themselves in their prescribed manner. Such a compartment or box may be stocked with provisions, clothing, emergency heaters, signal flares, water, a radio transmitter and the like.

Another object is to provide a box of this type which will be detached when the plane is in still air or not in flight.

The inventive features for attaining these and other objects are shown in connection with an airplane having a plurality of boxes attached to the side of the plane fuselage and which may be detached therefrom. The boxes then will descend at a slow rate being restrained in their motion by a parachute. The initial air drag on the parachute is used to trip the detaching mechanism.

In the accompanying drawing showing, by way of example, one of many possible embodiments of the invention, Fig. 1 is a perspective of an airplane and device thereon.

Fig. 2 is a fragmental view of the interior of the airplane.

Fig. 3 is a vertical sectional view showing much of the device in elevation, the section being taken along the line 3—3 of Fig. 1 looking in the direction of the arrows of said line, Fig. 4 is a sectional view of the box, the section being taken along the line 4—4 of Fig. 5, looking in the direction of the arrows of said line, Fig. 5 is a transverse sectional view of the box, the section being taken along the line 5—5 of Fig. 4, looking in the direction of the arrows of said line, Figs. 6 and 7 schematically show the operation of the seat of the box, Fig. 8 shows a detail of means for attaching the box to the airplane, Fig. 9 is a top view of a modification of a part of the invention, Fig. 10 is a fragmental sectional view showing a detail of the invention, Fig. 11 is a fragmentary front view showing a feature of the invention, and Fig. 12 is a perspective of the invention in operation.

This invention is shown in connection with an airplane 10 having a passenger carrying fuselage 11. A plurality of escape boxes 12 are detachably secured to the exterior of the fuselage at the side wall 14 thereof. When the boxes are detached from the airplane they will gradually descend, being supported by a parachute 15 through the medium of shroud lines 16, attached to a ring 18, suspension cables 19, each connecting the ring to eyes 20 securely mounted on the respective four top corners of the box.

An exit doorway 21 is provided in the side wall 14 of the fuselage so that passengers normally occupying plane chairs 22 may leave the fuselage through the doorway 21 and enter the escape box by pushing open a door 24 which normally closes the entranceway 25 into the box. In a manner described below, the box is detached from the fuselage for descent. It is a requirement that the door 24 be closed and that a predetermined number of chairs 26 provided in the box be occupied in order for the box to be released.

Each chair 26 in the box is provided with a depressible seat 28 free to move only a predetermined amount and normally biased to upper portion by springs 29. Each seat is provided with a depending engagement member 30 adapted to engage a control cord 31 anchored fast at one end such as at 32. The cord 31 extends from the anchored end 32, thence under each seat, with change-of-direction pulleys 34 being provided where the chairs are not alined. Spaced support pulleys 35 under each chair and mounted fast with respect to the floor 36 hold the cord under the engagement member 30 so that as the seat and member are depressed the cord will be "pulled" or in effect shortened, by a definite amount, as shown in Figs. 6 and 7. The "distance of pull" on the cord 31 is substantially twice the movement of the seat 28 permitted between upper and lower stops 38 and 39. The engagement member 30 is provided with rollers 40 to contact the cord so that any shortening of the cord will be transmitted in a direction away from the anchored end past any seat toward a lost motion loop section 41 in the cord.

One end of the cord, as mentioned, is anchored at 32. The other end 42 is attached to a latch bolt 44 mounted on the ceiling 45 of the box 12. When all slack is removed from the lost motion loop any additional movement or shortening pull on the cord draws the bolt 44. It is desirable in order to keep the cord 31 in position, to attach a light tension spring 46 at each end of the loop section at 48, 49.

In order for the closure of the box door 24 to govern the movement of the bolt 44, the cord, after extending under each seat, passes adjacent the doorway 25 being guided by change-of-direction pulleys 50, 51. A prong 52 fast on the jamb portion of the door 24 bears a roller 54 engageable with the cord which lightly engages pulleys 55 mounted on the inner face of the box wall 56. Closure of the door 24 effects a shortening of the cord in the same manner as does the depression of a seat 28.

The length of cord, anchorage position at 32, amount of slack in the lost motion loop 41, extent of the movement of the seats 28, and shortening action upon closing of door 24 are all so related that bolt 44 is drawn, when and only when, the predetermined number of seats are depressed (four seats in Fig. 5) and the door is closed. The door 24 is provided with a conventional latch 58 for holding the door closed.

It is contemplated that in practice that during an emergency the passengers will enter the box 12 and after the fourth passenger (if the box is built for four people) has entered the door is closed. Closure of the door takes up a portion of the slack in the loop as does the seating of each of three passengers. The seating of the fourth passenger draws the bolt 44.

The mounting of the boxes 12 on the side of the fuselage presents severe requirements. Any connectors must be of great strength and yet the force required to disengage them must be comparatively small for it is not deemed satisfactory to depend on power supplies when the plane itself has been damaged. Furthermore it is a virtual necessity that several connectors be used to prevent the boxes from being shaken loose in normal operation and it is necessary that these connectors be disengaged substantially simultaneously.

The connectors which I employ are shown most clearly in Fig. 3 at 59 and 59' each alike and having a ball portion 60 on the inner end mounted in a socket member 61 mounted fast on upper and lower channel members 62, 62' which are parts of the fuselage. The other end portion is a large head 64 having upper and lower concave cavities 65, 66 opening upwardly and downwardly respectively. The ball and head portions are joined by a shank 68 passing through the fuselage wall 14.

The connectors 59 and 59' are located along the channel members 62 and 62' to the outer of the fore and aft box walls 69 and 70. A ball shaped member 71 rigidly pends from a bracket 72 secured fast to an upper corner portion of the wall 69 and is disposed in the cavity 65 (Figs. 3 and 8) of the connector head 64. A similar construction, inverted, provides an upstanding ball member 72' at the lower corner portion, the member 72' being disposed in the cavity 66 of the connector 59'. The two connectors 59 and 59' are urged apart at their respective heads by a toggle 74 having extreme ends 76 of rounded shape disposed in the inner cavities (those not occupied by the ball member) to hold the connectors in tight engagement with the ball members. The lengths of the shanks 68 are such that this action, when the toggle is substantially straight maintains the box wall 56 against the fuselage wall 14. Guides 78 restrain the toggle to movement within a plane parallel to the walls 69 and 70 and connectors are located at each of these walls so that the box is held at four corners against the fuselage. Preferably, covering panels 79 and 80 are provided over the toggles to prevent the toggle of one box from being released by engagement with an adjacent box when the latter is released.

A stop 81 is provided to hold the toggle barely past dead center.

Normally the outer end 82 of the bolt 44 (Fig. 4) projects through a hole 84 in the box outer wall 85 and engages the upper face of a hook flange 86 forming an eave of a cover 88, lightly hinged as at 89, to the top 90 of the fuselage. Springs 91 and 92 tend to urge the cover upwardly against the holding action of the bolt 44.

When the bolt is drawn, as above described, the springs 91 and 92 cause a lifting of the cover 88 which permits the parachute 15 to be ejected by known means. The air impinging on the parachute causes the latter to pull on the ring 18 lying flat atop the ceiling 45. Before slack in the suspension cables 19 is taken up, the ring which is attached to the upper end 93 of working cables 94 passing over pulleys 96 and 98 pulls the toggle past dead center and causes at least one of the connectors 59 or 59' to be disengaged from the ball member 72 or 72'. The working cable has its opposite end 99 secured to the central pivot portion 100 of the toggle. The cables 94 and 19 are so proportioned in length that at least one suspension cable still contains slack before both toggles have passed dead center.

For clarity the invention was described above in a manner which required the presence of four passengers to detach the box. In many instances passengers would not be taken on the plane in multiples of four and so it is desirable to provide at least one box which may be released if there are one, two, three or four passengers assigned to the box. This may be done in several ways by altering the slack in take up loop 41. To do this I prefer to take up the slack by a modified or variable anchor 132 instead of a fixed anchor at 32.

The variable anchor 132 (Fig. 9) comprises a mount 134, provided with a central recess 133 and an annular dial face 135, securely mounted on the interior of the box. A drum 136 for winding a portion of the cord 31 is rotatably mounted in the central recess with the end 138 of the cord secured thereon. An index lever 139 rotates with the drum and extends over the dial so that by rotating the lever a portion of the cord is wound upon the drum. A plurality of lugs 140 are mounted on the dial just beyond the sweep of the lever and peripherally spaced to correspond to a shortening of the cord, when the lever and drum are rotated, equal to a shortening by the action of one seat 28. The lever may be locked as by a padlock 141 under the control of an officer before the flight in such a position as to "arm" the box for a desired number of passengers to occupy the box.

In use, it is contemplated that the attachment of the box will be made during the building of the airplane although the connectors and toggles can be manipulated into their proper places by rods inserted through ports. It is desirable to provide the toggle with holes 102 to facilitate their placement by hooked rods. The ring 18 is lightly secured as to the top of the ceiling 45 by light clips lest any shaking by it spring the toggle. Then the cover 88 is latched over the parachute against the force of springs 91 and 92.

At the beginning of a flight an officer assigns passengers to respective boxes and, if necessary, sets the variable anchor 132 for a number of persons fewer than the number of seats. Passengers are then assigned to certain boxes for use during an emergency.

In the event of an emergency, the passengers enter their assigned boxes through doorways 21 and 25 and take their seats in turn, each seating shortening the cord by the predetermined increment, until the last person has entered who closes the door. As the last person finally takes his seat the bolt 44 is drawn, releasing the cover 88. The cover is thrown back by springs 91 and 92 and out goes the parachute, the air drag on which jerks the ring 18 free from the clips 104 and first pulls on the work cables 94. The work cables pull the toggles to dead center and beyond; the connector heads are no longer held against the ball members and any vibration of the box or plane shakes them so that their holding action is no more. With load on the working cables rapidly diminishing the slack of the suspension cables is taken up and the parachute and box descend with the passengers inside.

It is contemplated that the box will be provided with adequate provisions and accommodations to supply the occupants with personal necessities so that it may be a refuge if it should land in an area of desolation.

Many obvious additional safety features may be provided in a known manner by those skilled in the art, such as signals on the pilot's control panel to indicate non-detached boxes, guards for the cord 31 to prevent tampering therewith.

While the springs 29 are of such strength to cause operation of the seat under a load of say 30 lbs., it may be preferable to employ shear pins 108 to hold the seat in upper position until the load is imposed on the seat and these pins may be designed to shear under such a load. However it is preferable that the springs be used as well as the shear pins.

In the event that the box should descend over water the box may be made to float by pontoons 105 screwed to the box by means 106 as shown in Fig. 11.

The invention claimed is:

1. In combination, an airplane and a box disposed against a side of the fuselage of the airplane; a pair of connectors having spherical end portions swiveled to the fuselage and outer heads having inner round recesses therein and open toward each other and outer round recesses open in the opposite directions; bracket members having opposed ball portions thereon and secured fast to the box, the ball portions being disposed in respective outer recesses; and toggle members having the outer ends thereof in the inner recesses to urge the connector heads against the bracket members.

2. A combination as is claim 1 and a ring disposed on the top of the box and secured weakly thereto; and a cable attached to the ring of the toggle member.

3. In combination, an airplane; a box detachably secured to the airplane; a confined parachute and ring; shroud lines connecting the parachute and ring; a toggle for releasing the box from the airplane; slack cables connecting the ring to the box and tight cables connecting the ring to the toggle; and means within the box for releasing the parachute from confinement.

4. In a box for attachment to an airplane, a latch on the top of the box; a plurality of depressible seats and a door; a cord having one end fast to the latch and extending under said seats, a part of the cord being displaceable by a depression of each seat to pull on the cord; a member on the door for displacing the cord when the door is closed, and means for securing the other end of the cord in a fixed position, and a lost motion loop on the cord with a spring shunting the loop.

5. In a box as in claim 4, said means including a drum having the cord at least partially wound thereon.

6. In a box as in claim 4 each seat being depressible to predetermined extent and all to the same extent.

7. In combination, a box having a confined parachute attached thereto; seats in the box and movable vertically; a cord extending under the seats in series and engageable with the seats for pulling the cord a given linear distance as the seat is depressed; a door to said box and having a part engagebale with said door to pull the cord a given distance when the door is closed; means having a part secured to the cord for releasing the parachute from confinement.

References Cited in the file of this patent

UNITED STATES PATENTS

| Number | Name | Date |
|---|---|---|
| 1,445,293 | Calthrop | Feb. 13, 1923 |
| 1,862,989 | Townsley | June 14, 1932 |
| 1,895,256 | Love | Jan. 24, 1933 |
| 2,077,910 | Thomson | Apr. 20, 1937 |

FOREIGN PATENTS

| Number | Country | Date |
|---|---|---|
| 428,895 | France | July 3, 1911 |
| 720,793 | France | Dec. 12, 1931 |